Sept. 8, 1959     A. G. SCHILBERG     2,902,753
METHOD OF FABRICATING VEHICLE CONTROL ARMS
Filed April 24, 1957
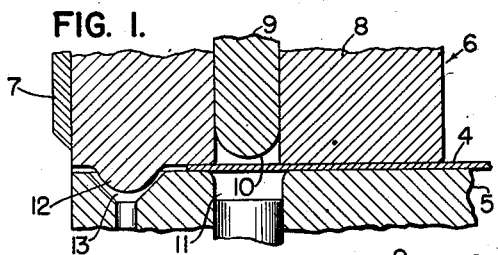
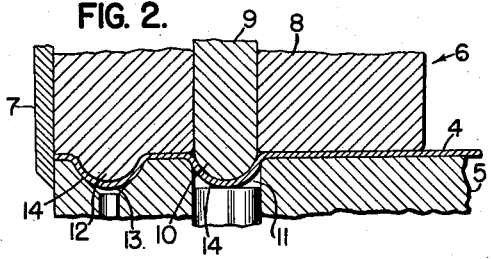
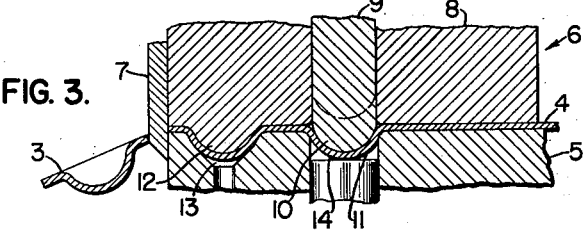
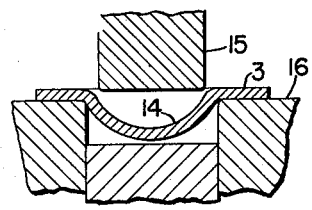
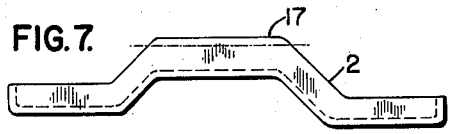
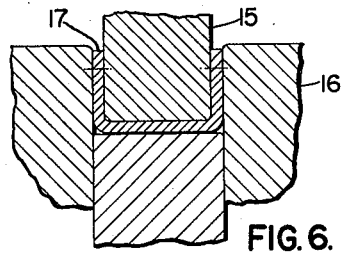
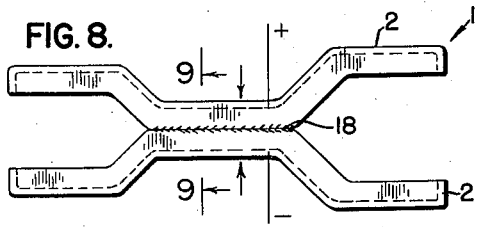
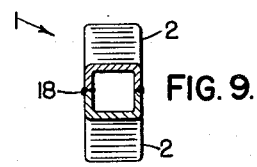
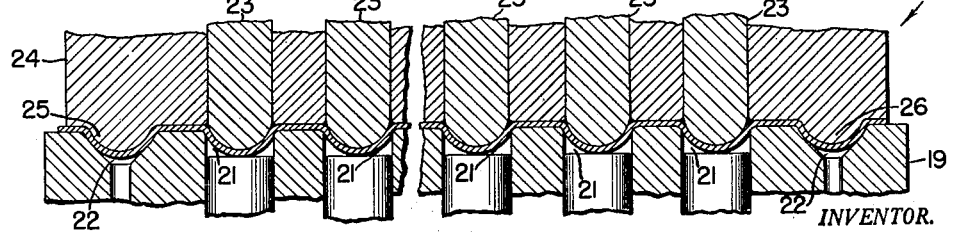
INVENTOR.
ARNOLD G. SCHILBERG
BY *Andrus & Scales*
ATTORNEYS.

United States Patent Office 2,902,753
Patented Sept. 8, 1959

2,902,753

METHOD OF FABRICATING VEHICLE CONTROL ARMS

Arnold G. Schilberg, Milwaukee, Wis., assignor to A. O. Smith Corporation, Milwaukee, Wis., a corporation of New York Application April 24, 1957, Serial No. 654,743

1 Claim. (Cl. 29—416)

This invention relates to a method of forming channel section members having flanges of predetermined varying depth from relatively thin sheet material.

In the manufacture of vehicle control arms, a pair of complementary curved channel section members are secured together along meeting flange edges as by flash welding to form a generally X-shaped arm. Each channel section member is formed from a flat blank cut from relatively thin sheet material. At the location of the meeting flange edges, each blank is formed with a longitudinal portion having increased depth to provide burn-off material which is consumed during the flash welding operation. Because the weld extends only over a portion of the length of each channel section member, provision for the burn-off material on each blank prevents economical nesting of blanks on the thin plate sheeting from which the blanks are cut. It is an object of this invention to provide a method of fabricating channel section members having flanges of predetermined varying depth whereby material requirements during the blanking operation are reduced and scrap loss is minimized resulting in substantial cost reductions over previous methods.

According to the invention, a channel section member having flanges of predetermined varying depth is formed from a sheet metal blank of generally constant width. The blank is locally stretched and permanently deformed to increase the blank area over portions of its length corresponding substantially to the portions of the finished channel member where increased flange depth is desired. The blank is then formed into a channel section member with the portions of increased area of the stretched blank providing the flange portions of increased depth.

The drawings furnished herewith illustrate the best mode of carrying out the invention as presently contemplated and set forth hereinafter.

In the drawings:

Figure 1 is a diagrammatic elevation of a double acting press showing thin plate material secured against movement before the punch descends to dish or bulge a blank;

Fig. 2 is a view similar to that of Figure 1 showing the punch dishing a blank;

Fig. 3 is a view similar to Figure 1 showing the punch dishing a subsequent blank while the shear is simultaneously actuated to cut off a constant width blank having been previously dished;

Fig. 4 is a plan view of a blank showing the dished or locally stretched area;

Fig. 5 is an enlarged diagrammatic representation in section showing the blank between the forming dies to form the blank into the channel-section member having flanges of increased depth over a portion of the length of the channel member;

Fig. 6 is a view similar to Fig. 5 showing the forming dies in their fully closed position;

Fig. 7 is a side elevation of a formed channel member showing the increased flange depth over a portion of its length;

Fig. 8 is a top plan view of a flash welded control arm wherein the portions of increased flange width along the meeting flange edges of each channel member have been consumed as burn-off material;

Fig. 9 is a view taken on line 9—9 of Fig. 8; and

Fig. 10 is a diagrammatic representation showing another method of securing the sheet material against movement during the dishing operation and wherein a plurality of blanks are dished simultaneously.

Referring to the drawings, the vehicle control arm 1 is fabricated from a pair of curved channel members 2 which are flash welded together over a portion of their length along their meeting flange edges. The channel members 2 are formed from blanks 3 having a generally constant width so that economical blank nesting on a sheet 4 of thin plate material is possible during the blanking operation.

According to the invention, a plurality of blanks 3 are laid out in series on sheet 4 for a pierce and cut-off type blanking operation. The sheet 4 rests on the bed 5 of a double acting press 6 and advances through the press, as shown in Figs. 1, 2 and 3. A shear 7 is provided at the rearward end of the press 6 to cut off successive blanks 3, as shown in Fig. 3.

The double acting press 6 includes a holddown member 8 and a ram 9 which move relative to the bed 5. The ram 9 is provided with a punch 10 at the lower end thereof for entering the cavity 11 provided in the bed 5 of the press. The holddown member 8 surrounds the ram and is provided with a holddown projection 12 rearwardly from punch 10. Forwardly of punch 10, the holddown member 8 has a relatively large engaging surface to provide the frictional resistance between the sheet and tool necessary for securing the sheet 4 within the press 6. A cavity 13 is provided in bed 5 rearwardly of cavity 11 and parallel thereto for receiving projection 12 of the holddown member 8 for clamping the sheet rearwardly of the punch 10. The punch 10 and projection 12 and their respective cavities 11 and 13 extend transversely of the press a distance corresponding to the longitudinal portion of channel 2 having increased flange depth. The distance between the center lines of cavities 11 and 13 corresponds to the width of blank 3.

After the sheet 4 is initially indexed within the press, the punch 10 and holddown member 8 descend together toward the sheet. The holddown member 8 engages the sheet to secure it within the press and the punch 10 continues downwardly to deform the sheet into the cavity 11 to provide the bulge 14. The sheet is then advanced one blank width into the press and the bulge 14 placed into cavity 13. The holddown member 8 and punch 10 descend again with the projection 12 of the holddown member engaging bulge 14 previously formed. In this manner, the sheet is securely held rearwardly as well as forwardly of the punch 10 so that as the punch descends to form bulge 14 in the next blank portion, the material is locally stretched to form the bulge. After the bulge 14 has been formed in the second blank portion, the sheet is again advanced in the press to place the last formed bulge into the cavity 13 so that the sheet may again be well secured forwardly and rearwardly of the punch 10. As the press elements now descend to form bulge 14 in the next blank portion, the shear 7 operates to sever the first bulged blank 3 from the sheet 4. This pierce-cutoff type operation is continued over the length of sheet 4.

After the individual blanks 3 are trimmed to provide rounded end portions, as shown in Fig. 4, they are subjected to a press forming operation to form the blank into the channel section member 2, shown in Fig. 7, The forming operation is shown diagrammatically in Figs. 5 and 6, wherein the blanks 3 are placed between the ram 15 and die 16 of the press. In the process of forming the channel section member 2, the bulged portion 14 is flattened into the web portion of the channel and the increased blank width afforded by the bulge provides the channel with increased flange depth corresponding substantially to the length of the bulge. As seen in Fig. 6 and Fig. 7, the channel member 2 is formed with projecting flange portions 17 above the dot-dash lines corresponding substantially to the length of bulge 14. By virtue of the elimination of the bulge, the projecting portions 17 of the channel member provide an increased flange depth over the flange depth of the remainder of the channel member.

As shown in Figs. 8 and 9, a pair of the channel members 2 are disposed in flange facing relation and flash welded together at the joint 18 formed between the opposed projecting flange portions 17. In the process of flash welding, the added flange depth of portions 17 is burned off so that the channel members 2 of control arm 1 have substantially constant flange depth over their full length.

The method of the invention has been applied to a control arm blank 3 inches wide and having an original thickness of .164 inch. The blank was locally stretched to form a bulge in the blank extending over a length corresponding to the weld area. The bulge extended over approximately half the width of the blank and the reduced gauge thickness in the bulged area averaged about .137 inch representing a gauge reduction of over 16.5%. This gauge reduction over about half of the width of the blank provided a 20% increase in blank width over the length of the weld area or about 5/16 inch increase in flange depth which was available for flash burn-off. Providing burn-off material in accordance with the method of this invention eliminates use of a blank contour having uneconomical lateral projections. It is estimated that with constant width blanks the material saving realized amounts to a substantial 17%. Furthermore, because of the increased strength resulting from the cold working in the bulged area, the reduced gauge thickness of that area does not affect the strength of the finished channel member.

While the above figures generally hold true for all intermediate blanks 3 cut from sheet 4, there will be some variation for the first and last blanks cut from the sheet. When the sheet 4 is initially indexed into the press, the end thereof rests midway between the cavities 11 and 13, as shown in Fig. 1, so that the sheet is not engaged by projection 12 of the holddown member rearwardly of the punch 10. As a result, when the punch 10 descends to place bulge 14 in the first blank portion, some material may be drawn in from the rearward edge of the sheet if the frictional resistance developed rearwardly of the punch is inadequate. In the instance of the last blank portion, material may be drawn in from the forward edge of the sheet if frictional resistance forwardly of punch 10 is inadequate. In either case, the increase in blank width will be somewhat less than 20% over the length of the weld area and may be compensated for by providing the first and last blank to be cut from sheet 4 with a corresponding increase in width.

According to the embodiment shown in Fig. 10, the pierce-cutoff type operation for forming the blanks 3 illustrated in Figs. 1, 2 and 3 is replaced by an operation wherein spaced bulges 14 corresponding to individual blank portions are formed in the entire sheet 4 in a single press operation. The bed 19 of the press 20 shown in Fig. 10 is provided with a plurality of longitudinally spaced and aligned intermediate cavities 21 and end cavities 22 which extend laterally in accordance to the length of the weld joint 18 to be provided between the channel members 2 comprising the arm 1. The press ram, not shown, carries a plurality of spaced punches 23 which are adapted to enter the intermediate cavities 21. The holddown member 24 extends substantially over the full length of the working bed 19 of the press and surrounds the punches 23. Projections 25 and 26 extend downwardly from the holddown member in alignment with cavities 22 provided in the respective ends of the bed 19.

In the operation of press 20 shown in Fig. 10, a sheet 4 is disposed over the bed 19 of the press and the holddown projections 25 and 26 initially engage the sheet. As the hold down member continues downwardly to clamp sheet 4 with respect to the bed, the projections 25 and 26 deform the sheet 4 into the end cavities 22 to provide bulges 14 in the respective ends of the sheet to further secure the sheet. With the sheet secured in this manner by holddown member 24 the punches 23 descend and deform the sheet 4 by locally stretching the material into the intermediate cavities 21 to form the intermediate bulges 14. Thus, spaced bulges 14 corresponding to individual blank portions are formed into the entire sheet 4 in one press operation. The individual constant width blanks 3 shown in Fig. 4 are then severed from the sheet and formed into channel members 2 as hereinbefore described.

While the end cavities 22 receiving projections 25 and 26 of the holddown member 24 are shown in Fig. 10 to be similar to the intermediate cavities 21, the bulges formed therein are not wholly produced by local stretching. As the holddown projections 25 and 26 of Fig. 10 enter the corresponding cavities, the end bulges are partially formed by drawing adjacent unsecured materials into the cavities. As a result, the bulges 14 provided in the first and last blank in accordance with the method of Fig. 10 will provide somewhat less than 20% increase in blank width over the length of weld joint 18 similarly to the bulges in the first and last blank of the pierce-cutoff type operation.

Various modes of carrying out the invention are contemplated as being within the scope of the following claim particularly pointing out and distinctly claiming the subject matter which is regarded as the invention.

I claim:

In a method of fabricating a vehicle control arm comprising, securing a sheet of thin plate material from which a plurality of blanks are to be cut, against substantially all movement in the plane of the sheet, stretching portions of the sheet corresponding to the individual blanks by deforming the material into dished contours of lesser width than the blank and extending over a predetermined length of the blank to provide each blank with an increased surface area, severing the sheet along straight lines extending substantially midway between the dished contours to provide separate constant width blanks, forming each blank into a channel section member whereby the increased surface area over the predetermined length of each blank is forced laterally outwardly with respect to the blank to provide each channel member with flange portions of greater depth over said predetermined length than the depth of the remainder of the flanges, disposing a pair of said channel section members in position for welding with the flange edges in facing relation and with the portions of the flanges having increased depth in opposed and spaced relation, and flash welding the channel members together over the length of increased flange depth to form the control arm with the increased flange material provided on the opposed flanges serving as burn-off material for the flash welding operation.

References Cited in the file of this patent

UNITED STATES PATENTS

| | | |
|---|---|---|
| 1,715,135 | Lambert | May 28, 1929 |
| 1,857,505 | Heineman | May 10, 1932 |
| 1,940,305 | Kapitke | Dec. 19, 1933 |
| 1,994,428 | Keil | Mar. 12, 1935 |
| 2,245,789 | Klavik | June 17, 1941 |